United States Patent [19]

Yamamoto et al.

[11] 4,204,873
[45] May 27, 1980

[54] SINTERED CERAMIC BODY FOR CUTTING TOOLS

[75] Inventors: Yoshihiro Yamamoto, Iwakura; Kenji Sakurai, Komaki; Hiroshi Tanaka, Aichi, all of Japan

[73] Assignee: NGK Spark Plug Co., Ltd., Nagoya, Japan

[21] Appl. No.: 37,606

[22] Filed: May 10, 1979

[30] Foreign Application Priority Data

Jun. 13, 1978 [JP] Japan .................... 53-71240

[51] Int. Cl.² .................... B24D 3/04; C04B 31/16; C04B 35/44; C04B 35/56
[52] U.S. Cl. .................... 106/43; 51/307; 51/309; 106/65; 106/73.4
[58] Field of Search .................... 106/43, 65; 51/307, 51/309

[56] References Cited

U.S. PATENT DOCUMENTS

| | | |
|---|---|---|
| 2,939,796 | 6/1960 | Wolff et al. .................... 106/43 |
| 4,046,517 | 9/1977 | Soga .................... 51/307 X |

Primary Examiner—Helen M. McCarthy
Attorney, Agent, or Firm—Sughrue, Rothwell, Mion, Zinn and Macpeak

[57] ABSTRACT

A sintered ceramic body for use in cutting tools which has an average crystal grain size of not more than about $2\mu$ and comprises about 60 to 95% by volume of (a) $Al_2O_3$ and the remainder being composed of (b) WC, provided that it may contain $W_2C$ in which case the intensity ratio $I_{W_2C}(101)/I_{WC}(111)$ in X-ray diffraction using $CuK\alpha$ rays is not more than about 0.5, and (c) TiN, the volume ratio of components (b) to (c) being about 5:95 to 95:5.

9 Claims, 4 Drawing Figures

SINTERED CERAMIC BODY FOR CUTTING TOOLS

BACKGROUND OF THE INVENTION

1. Field of the Invention

This invention relates to a sintered ceramic body for use in cutting tools. More specifically, this invention relates to a sintered ceramic body of a novel composition having excellent thermal shock resistance. A method for producing such a sintered body is also provided.

2. Discussion of the Prior Art

A sintered body comprising alumina ($Al_2O_3$) as a main ingredient is the only sintered ceramic body now available for producing cutting tools which can be used at a cutting speed of more than 200 m/min. However, it is susceptible to breakage in milling, etc. Various attempts have therefore been made to increase its strength by adding a carbide such as TiC, WC or $Mo_2C$, a nitride or nitridecarbide such as TiN, ZrN or TiCN, or a boride such as $TiB_2$ to the $Al_2O_3$. However, such ceramics have low resistance to thermal shock, and are susceptible to breakage in milling, etc. These defects are attributed to this low thermal conductivity. Among the aforesaid additives for $Al_2O_3$, WC has a thermal conductivity of 0.45 cal/cm.sec.°C., the highest among them. Addition of WC, therefore, ought to increase the thermal conductivity of the sintered ceramic body and, therefore, its thermal shock resistance. Actually, however, the result is much the same as in the case of adding TiC which has a thermal conductivity of 0.04 cal/cm.sec.°C.

Extensive investigations of $Al_2O_3$-WC ceramic bodies have led to the discovery that because (i) fine pores with a size of less than $0.5\mu$ are liable to occur in such a sintered ceramic body, (ii) a part of the carbon in WC reacts with $Al_2O_3$ to form brittle $W_2C$ in the crystals, and (iii) the grain growth of $Al_2O_3$ is vigorous; a decrease in strength occurs, thermal shock resistance is not enhanced, and the result is much the same as in the case of using other additives having a lower thermal conductivity.

Further investigations have led to the discovery that when a certain specified amount of TiN is added together with WC to $Al_2O_3$, a sintered ceramic body can be obtained which is free from deterimental pores and has a crystal grain size of not more than $2\mu$ and excellent thermal shock resistance. When a cutting tip is made from this ceramic and used in milling, it shows more than twice as high a breaking resistance as conventional tools of the $Al_2O_3$-carbide (nitride) type.

SUMMARY OF THE INVENTION

A principal object of the present invention is to provide a sintered ceramic body containing $Al_2O_3$ as a main ingredient, which is suitable for producing cutting tools which can be used at relatively high cutting speeds and which are less susceptible to breakage.

Another object of the present invention is to provide a sintered ceramic body with high thermal shock resistance.

A further object of the present invention is to provide an $Al_2O_3$ containing ceramic having high thermal conductivity.

Still another object of the present invention is to provide a sintered ceramic body containing $Al_2O_3$ and WC having a low $W_2C$ concentration in the crystal.

Still a further object of this invention is to provide a novel method of making such a sintered ceramic body.

Thus, according to this invention, there is provided a sintered ceramic body for use in cutting tools which has an average crystal grain size of not more than $2\mu$ and comprises 60 to 95% by volume of (a) $Al_2O_3$ and the remainder (5 to 40%) being (b) WC, provided that it may contain $W_2C$ in which case the intensity ratio $I_{W_2C}(101)/I_{WC}(111)$, of X-ray diffraction using $CuK\alpha$ rays is not more than about 0.5, preferably less than about 0.2, and (c) TiN, the volume ratio of component (b) to (c) being from about 5:95 to 95:5.

BRIEF DESCRIPTION OF THE DRAWINGS

The invention will be described in more detail below with reference to the accompanying drawings.

DETAILED DESCRIPTION OF THE INVENTION

The sintered body of this invention consists essentially of components (a), (b) and (c). The amount of component (a) should be about 60 to 95% by volume, preferably about 65 to 90% by volume, most preferably about 85 to 87% by volume, and the remainder consisting of components (b) and (c). The importance of these limitations is clearly seen from the following Experiments.

EXPERIMENT 1

To an $\alpha$-$Al_2O_3$ powder having a purity of 99.9% and an average particle diameter of $0.7\mu$ were added WC powder having a purity of 99.0%, an average particle diameter of $0.6\mu$ and a carbon content of 6.18%, TiN powder having a purity of 99.0%, an average particle diameter of $1.1\mu$ and a nitrogen content of 21.2%, and 0.6% by weight, based on the total weight of the WC powder and TiN powder, of carbon powder. The powders were mixed for 40 hours in a customary manner. The volume ratio of the WC powder to the TiN powder was maintained constant at 1:1, 1:10, and 10:1 to perform runs (a) to (c), respectively. The mixture was filled into a graphite mold, and hot-pressed at a temperature of 1800° C. and a pressure of 200 kg/cm² for 15 minutes. The hot-pressed structure was ground by a diamond abrasive into an SNP (Square Negative Polish) 432 tip with a size of 12.7×12.7×4.8 mm, and subjected to a breaking test upon milling under the following conditions.

MILLING CONDITIONS:

Cutting speed: 177 m/min.
Cut: 1.0 mm
Feed: 0.3 mm/blade
Cutter: NLFO 6R (used with a single blade)
Engaging angle: 20°
Workpiece: 100×100 mm surface of chrome-molybdenum steel (HRC 39-41)*

*hardness value measured according to JIS Z 2245 by Rockwell C-scale

Testing Method: The number of cuttings till the breakage of the tip was determined. The test was repeated ten times, and the average value was calculated.

Figure 1:
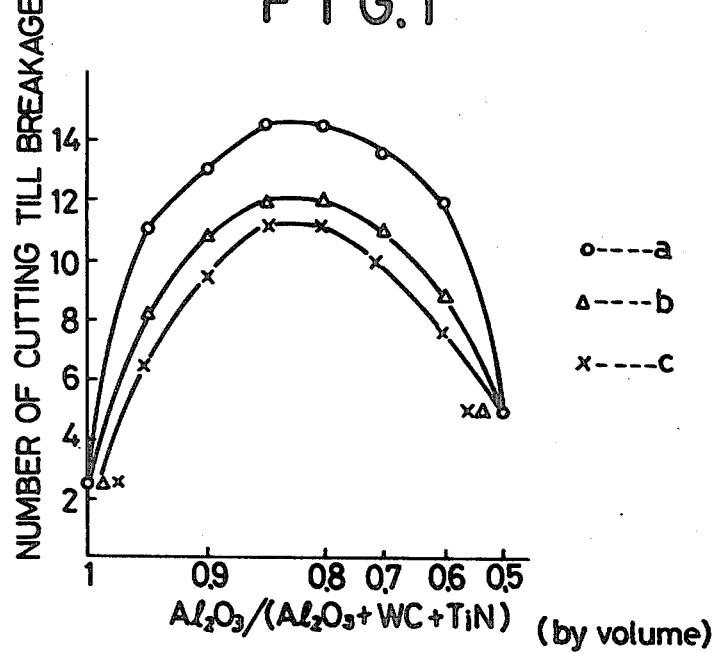
FIG. 1 is a graph showing the relation between the volume of $Al_2O_3$ and the number of cuttings till breakage, which represents the results of Experiment 1.

The results of the test are shown in FIG. 1. In FIG. 1, (a) refers to the case where the volume ratio of the WC powder to the TiN powder is 1:1; (b) refers to the case where the ratio is 1:10; and (c) refers to the case where the ratio is 10:1.

It is seen from the results obtained that when the amount of $Al_2O_3$ is more than 95% by volume, the addition of WC and TiN produces no effect, and if it is less than 60% by volume, a compact sintered body having small grains cannot be obtained and its strength is not sufficient.

Experiment 2 below demonstrates that the volume ratio of components (b) to (c) should be from about 5:95 to 95:5, preferably from about 1:2 to 2:1, most preferably from about 9:10 to 10:9.

EXPERIMENT 2

Figure 2:
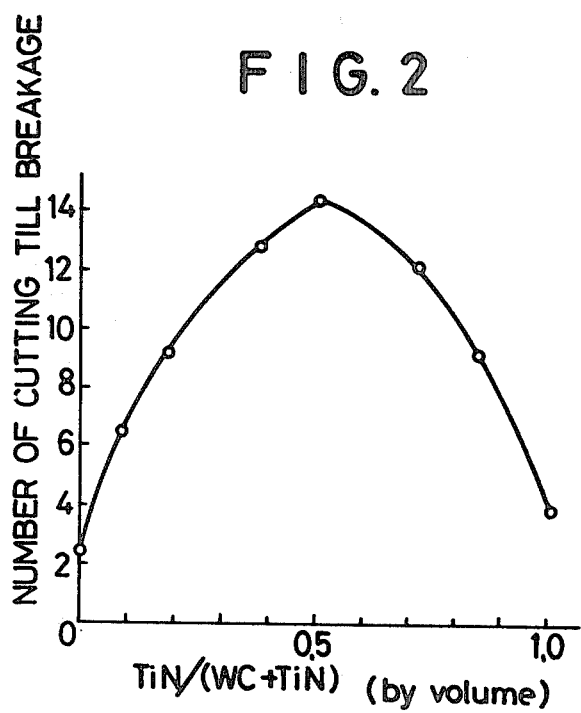
FIG. 2 is a graph showing the relation between the volume ratio of TiN to the sum of WC and TiN and the number of cuttings till breakage, which represents the results of Experiment 2.

Experiment 1 was repeated except that 14% by volume in total of WC powder and TiN powder at varying volume ratios, and 0.6% by weight carbon, based on the total weight of the WC and TiN powders were added to 86% by volume $\alpha$-$Al_2O_3$ powder. The same breaking test upon milling as in Experiment 1 was performed, and the results are shown in FIG. 2.

The results clearly demonstrate that unless the volume ratio of WC to TiN is within the range specified in this invention, the synergistic effect of the two components, WC and TiN, is not exhibited, and a sintered body of sufficient strength cannot be obtained. If the sintered body consists only of $Al_2O_3$ and WC, it corresponds to the case of TiN/(WC+TiN) in FIG. 2 being 0, and the number of cuttings till breakage is as small as 2.3. Likewise, if the sintered body consists only of $Al_2O_3$ and TiN, it corresponds to the case of TiN/(WC+TiN) in FIG. 2 being 1, and the number of cuttings till breakage is as small as 3.9. When the sintered body consists of $Al_2O_3$, WC and TiN, the number of cuttings till breakage increases by the synergistic effect of WC and TiN.

In the sintered body of this invention a part of WC as component (b) sometimes changes to $W_2C$. If the amount of WC changed to $W_2C$ is below a certain limit, the strength of the resulting product is not appreciably decreased. By measuring the intensity ratio $I_{W_2C}(101)/I_{WC}(111)$ in X-ray diffraction using $CuK\alpha$ rays as a measure for the ratio of $W_2C$ to WC, and on the basis of the results of Experiment 3 below it is seen that if this intensity ratio is not more than about 0.5, the resulting product can be fully used for cutting tools.

EXPERIMENT 3

Experiment 2 was repeated except that the amount of carbon powder was not set at 0.6% by weight, but was varied. The breaking test in milling was performed in the same manner as in Experiment 2. The intensity ratio in X-ray diffraction was measured.

METHOD OF X-RAY DIFFRACTION CONDITIONS

Shape of the sample: 12.7×12.7×4.8 mm
Conditions: Cu cathode
Ni filter
35 KV-20 mA
Time constant (T.C.)=4 sec.
Rotating speed (G.S.)=1°/min.
Slit width=1-1-0.3

Figure 3:
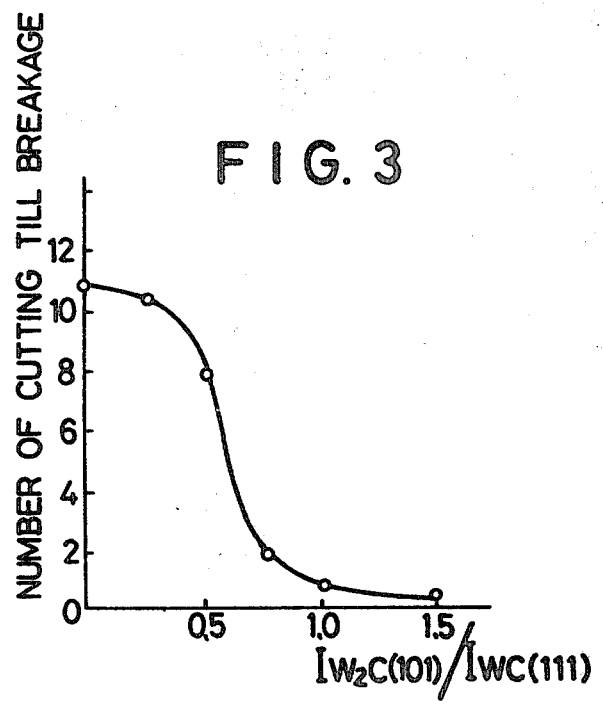
FIG. 3 is a graph showing the relation between $I_{W_2C}(101)/I_{WC}(111)$ and the number of cuttings till breakage, which represents the results of Experiment 3.

The results are shown in FIG. 3. It is seen from the results that if $I_{W_2C}(101)/I_{WC}(111)$ is not more than 0.5, the resulting sintered ceramic body has high resistance to breakage.

It is essential that the sintered body of this invention consist of the components (a), (b) and (c), and have an average crystal particle diameter of not more than $2\mu$, preferably $1\mu$ or less. As will be clearly seen from the following Examples and Comparative Examples, if the average crystal grain particle of the sintered ceramic is above $2\mu$, the sintered ceramic becomes brittle and cannot withstand milling.

In producing the sintered body of this invention, the components (a), (b) and (c) are first selected in predetermined proportions and mixed. The starting powdery mixture is then sintered at a high temperature and a high pressure. Sintering is usually performed by a uniaxial hot press in a graphite mold or by a hot hydrostatic press. The sintering temperature is generally from about 1600° to 1900° C., and the sintering time is generally from about 5 to 30 minutes. Generally, better sintered bodies are obtained at higher pressures. Usually, the pressure is about 100 to 300 kg/cm² in a hot press, and about 500 to 2000 kg/cm² in a hot hydrostatic press. The hot hydrostatic press is suitable for obtaining uniform compact sintered bodies on a mass-production basis.

The method in accordance with this invention is characterized by adding carbon powder in the preparation of the starting powder mixture. It has been found that the addition of carbon powder serves to prevent the conversion of a large amount of WC to $W_2C$ during sintering. If a large quantity of $W_2C$ is formed, the strength of the sintered body is reduced as explained above. Experiment 4 shows that the carbon powder should be added in an amount such that the intensity ratio $I_{W_2C}(101)/I_{WC}(111)$ does not exceed about 0.5 but the average crystal grain size of the sintered ceramic is not more than $2\mu$. Generally a lower limit on the amount of carbon added is 0.05 parts by weight per 100 parts by weight WC and TiN. The upper limit varies with the starting material composition.

EXPERIMENT 4

Carbon powder (carbon black) in varying amounts was added to (1) a starting powder mixture consisting of 71% by volume of $\alpha$-$Al_2O_3$ powder, 16% by volume of WC powder and 13% by volume of TiN powder, and also to (2) a starting powder mixture consisting of 93% by volume of $\alpha$-$Al_2O_3$ powder, 4% by volume of WC powder and 3% by volume of TiN powder. Otherwise, the sintering was performed in the same manner as in Experiment 1, and the same breakage test in milling was performed.

Figure 4:
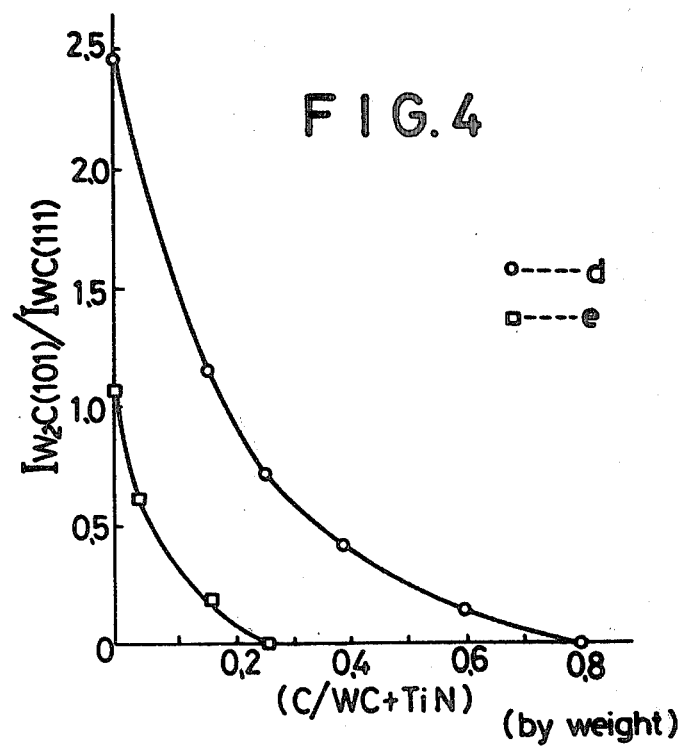
FIG. 4 is a graph showing the relation between the amount of carbon powder added and $I_{W_2C}(101)/I_{WC}(111)$, which represents the results of Experiment 4.

The results are shown in FIG. 4. In FIG. 4, (d) refers to the case of adding carbon powder to the starting powder mixture (1) above, and (e) refers to the case of adding it to the starting powder mixture (2) above. It is seen from FIG. 4 that when the amount of carbon powder is less than 0.05 part by weight per 100 parts by weight of WC and TiN combined, $I_{W_2C}(101)/I_{WC}(111)$ exceeds 0.5 (namely, the amount of $W_2C$ formed increases), and the resulting sintered ceramic body cannot withstand milling. When the amount of carbon powder increases, formation of $W_2C$ does not occur, but the crystal grain sizes of $Al_2O_3$ and WC tend to increase. For this reason, the upper limit on the amount of the carbon powder is determined properly so that the average crystal grain size of the sintered ceramic is not more than $2\mu$. For example, in the case of the starting powder (1) in Experiment 4, the upper limit of the carbon powder is 0.8 part by weight. In the case of the starting powder mixture (2), the upper limit of the amount of the carbon powder is 0.3 part by weight. Specific examples of the carbon powder are carbon black, and acetylene black. If carbon is likely to come from other raw materials during the production of the sintered ceramic, the amount of the carbon powder may be correspondingly decreased.

The sintered ceramic body of this invention for use in cutting tools has excellent thermal shock resistance, and sintered ceramic does not increase, thanks presumably to the synergistic effect of WC and TiN.

The following Examples and Comparative Examples illustrate the present invention in more detail. It should be understood that these examples are provided for illustration and the invention is not limited to these examples.

EXAMPLE 1 AND COMPARATIVE EXAMPLE 1

The same $\alpha$-$Al_2O_2$ powder, WC powder, TiN powder and carbon black as used in Experiment 1 were mixed in the amounts indicated in Table 1. In a stainless steel ball mill, 0.5 kg of the resulting mixture was ball-milled for 40 hours together with 5 kg of superalloy balls and 0.4 kg of acetone. The acetone was volatilized to form a test batch. The batch was filled into a graphite mold and hot-pressed at a temperature of 1700° to 1900° C. and a pressure of 200 kg/cm² for 5 minutes. The shape of the hot press was 13.5×13.5×5.3 mm. The hot pressed articles were subjected to a breakage test in milling in the same manner as in Experiment 1. The results are shown in Table 1.

For comparison, other compositions shown in Table 1 were hot-pressed and subjected to a milling breakage test as above. The results are also shown in Table 1.

Table 1

| Sample No. | Composition (vol. %) | | | | | | | | | Sintering temperature (°C.) | Physical Properties | | | Average particle diameter | Milling breakage life (times) | Remarks |
|---|---|---|---|---|---|---|---|---|---|---|---|---|---|---|---|---|
| | $Al_2O_3$ | WC | TiN | C*¹ | TiC | TaC | TaN | Co | Others | | Specific gravity | hardner (HV) | Phases which appeared | | | |
| 1 | 86 | 7 | 7 | 0.5 | | | | | | 1800 | 4.87 | 2010 | $Al_2O_3$, WC, TiN | 0.8 | 14.50 | Invention |
| 2 | 93 | 4 | 3 | 0.1 | | | | | | 1750 | 4.46 | 1880 | $Al_2O_3$, WC, TiN, $W_2C$($W_2C$/WC*²=0.4) | 1.2 | 11.20 | Invention |
| 3 | 71 | 16 | 13 | 0.3 | | | | | | 1850 | 5.98 | 1920 | $Al_2O_3$, WC, TiN, $W_2C$($W_2C$/WC=0.3) | 0.9 | 12.80 | Invention |
| 4 | 60 | 25 | 15 | 0.9 | | | | | | 1850 | 6.95 | 1850 | $Al_2O_3$, WC, TiN | 1.0 | 13.50 | Invention |
| 5 | 86 | 7 | 7 | 0.05 | | | | | | 1800 | 4.91 | 1980 | $Al_2O_3$, WC, TiN $W_2C$($W_2C$/WC=2.5) | 0.9 | 1.35 | Comparison |
| 6 | 86 | 7 | 7 | 0.8 | | | | | | 1800 | 4.85 | 1780 | $Al_2O_3$, WC, TiN | 3.0 | 2.50 | Comparison |
| 7 | 70 | | | | 30 | | | | | 1800 | 4.3 | 1950 | $Al_2O_3$, TiC | 2.1 | 4.90 | Comparison |
| 8 | 80 | 15 | | | | | | 5 | | 1650 | 5.95 | 1790 | $Al_2O_3$, WC, Co | 3.2 | 2.60 | Comparison |
| 9 | 86 | 14 | | 0.1 | | | | | | 1800 | 5.86 | 1640 | $Al_2O_3$, WC | 3.5 | 2.20 | Comparison |
| 10 | 60 | 25 | | | 15 | | | | | 1850 | 7.01 | 1850 | $Al_2O_3$, (Ti, W)C | 2.1 | 5.20 | Comparison |

¹Amount of carbon (C) (parts by weight per 100 parts by weight of the WC powder and TiN powder combined.
*²$W_2C$/WC stands for $I_{W_2C}(101)/I_{WC}(111)$.

cutting tools made of this ceramic body show more than twice as high a resistance to breakage as conventional ones. This is believed to be due to the fact that because WC and TiN in predetermined amounts are added to $Al_2O_3$, the reduction of strength, which is associated with the case of adding only WC to $Al_2O_3$, does not occur. As will also be clear from the following Examples and Comparative Examples, when both WC and TiN are added to $Al_2O_3$, deterimental pores are not formed, and the crystal grain size of the resulting sin- It is seen from the results shown in Table 1 that samples Nos. 1 to 4 in which the ingredients are within the ranges specified in the invention show far better milling breakage lives than samples Nos. 5 and 6 in which any one of the ingredients are outside the ranges specified in the invention. Samples Nos. 7 to 10 which have different ingredients than the ceramics of this invention have inferior milling breakage lives. In particular, from the fact that sample No. 10 of $Al_2O_3$-WC-TiC is inferior to the $Al_2O_3$-WC-TiN ceramic of this invention, it is understood that the addition of TiN in place of TiC brings about an unexpected result.

EXAMPLE 2 AND COMPARATIVE EXAMPLE 2

A cutting test was performed under the following conditions using the tips produced in Example 1 and Comparative Example 1, and the lives of the cutting tools which lasted until $V_B = 0.4$ mm was reached were measured. The results are shown in Table 2.

Workpiece: gray cast iron FC20
Cutting speed: 500 m/min., 200 m/min.
Cut: 1.0 mm
Feed: 0.3 mm/rev.
Tool profile: −5, −7, 5, 7, 15, 15, 08

Table 2

| Sample No. *3 | Cutting speed (m/min.) 500 | 200 | Remarks |
|---|---|---|---|
| 1 | 56 minutes | 131 minutes | invention |
| 2 | 49 minutes | 116 minutes | " |
| 3 | 61 minutes | 140 minutes | " |
| 7 | 40 minutes | 101 minutes | comparison |
| 8 | 15 minutes | 49 minutes | " |
| 9 | Cutting impossible | 2 minutes | " |

*3 The samples used had the same compositions as in Example 1 and Comparative Example 1.

The results in Table 2 demonstrate that the sintered ceramic bodies of this invention provide cutting tools of long service lives.

While the invention has been described in detail and with reference to specific embodiments thereof, it will be apparent to one skilled in the art that various changes and modifications can be made therein without departing from the spirit and scope thereof.

What we claim is:

1. A sintered ceramic body for use in cutting tools which has an average crystal grain size of not more than about $2\mu$ and comprises about 60 to 95% by volume of (a) Al$_2$O$_3$ and the remainder being composed of (b) WC, provided that it may contain W$_2$C in which case the intensity ratio $I_{W_2C}(101)/I_{WC}(111)$ in X-ray diffraction using CuK$\alpha$ rays is not more than about 0.5, and (c) TiN, the volume ratio of components (b) to (c) being from about 5:95 to 95:5.

2. The ceramic body of claim 1, wherein the volume ratio of components (b) to (c) is about 1:2 to 2:1.

3. The ceramic body of claim 1, wherein the amount of component (a) is about 85 to 87% by weight, and the remainder being composed of components (b) and (c) in a (b)/(c) volume ratio of about 9/10 to 10/9.

4. The ceramic body of claim 1, wherein said body comprises about 65 to 90% by volume of (a) Al$_2$O$_3$.

5. A method for producing a sintered ceramic body for use in cutting tools, which comprises adding carbon powder to a starting powder consisting of about 60 to 95% by volume of Al$_2$O$_3$ and the remainder WC and TiN, the volume ratio of WC to TiN being about 5:95 to 95:5; and sintering a mixture of these components at a high temperature and a high pressure, said carbon being added in an amount such that the intensity ratio $I_{W_2C}(101)/I_{WC}(111)$ in X-ray diffraction using CuK$\alpha$ rays is not more than about 0.5 and the crystal grain size of the sintered ceramic body does not exceed about $2\mu$.

6. The method of claim 5, wherein said starting powders comprise about 60 to 95% by volume of Al$_2$O$_3$ and the remainder being WC and TiN, the volume ratio of WC to TiN being about 1:2 to 2:1.

7. The method of claim 5, wherein said starting powders comprise about 85 to 87% by volume of Al$_2$O$_3$ and the remainder being WC and TiN, the volume ratio of WC and TiN being about 9:10 to 10:9.

8. The method of claims 5 or 6 or 7, wherein said sintering is conducted by hot pressing at a temperature of about 1600° to 1900° C. and at the pressure of about 100 to 300 kg/cm$^2$.

9. The method of claim 5, wherein said carbon powder is added in an amount of at least about 0.05 parts by weight per 100 parts by weight WC and TiN.

* * * * *